Figure 1:
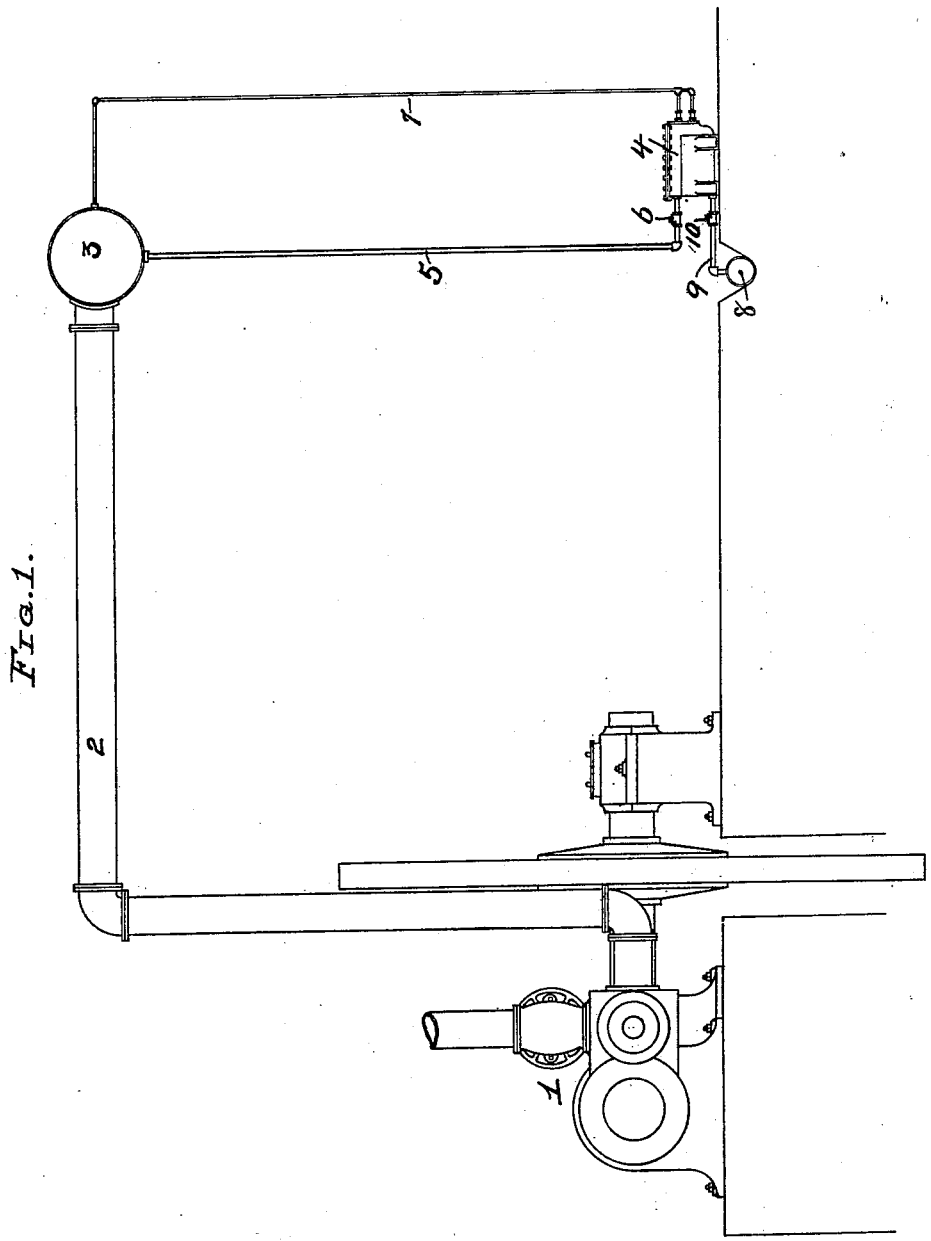

No. 673,659. Patented May 7, 1901.
E. L. & D. McGARY.
APPARATUS FOR REMOVING LIQUIDS FROM OR DISCHARGING LIQUIDS INTO VACUUM.
(Application filed Feb. 1, 1901.)
(No Model.) 7 Sheets—Sheet 1.

WITNESSES:
Walter Lamaree
Fred D. Sweet.

INVENTORS
Eugene L. McGary
Daniel McGary
BY Kay & Totten
ATTORNEYS

No. 673,659.  
E. L. & D. McGARY.  
Patented May 7, 1901.

APPARATUS FOR REMOVING LIQUIDS FROM OR DISCHARGING LIQUIDS INTO VACUUM.

(Application filed Feb. 1, 1901.)

(No Model.)  
7 Sheets—Sheet 2.

WITNESSES:
Walter Tamarise
Fred D. Sweet

INVENTORS
Eugene L. McGary
Daniel McGary
BY Kay & Totten
ATTORNEYS

No. 673,659. Patented May 7, 1901.
E. L. & D. McGARY.
APPARATUS FOR REMOVING LIQUIDS FROM OR DISCHARGING LIQUIDS INTO VACUUM.
(Application filed Feb. 1, 1901.)
(No Model.) 7 Sheets—Sheet 4.

No. 673,659. Patented May 7, 1901.
E. L. & D. McGARY.
APPARATUS FOR REMOVING LIQUIDS FROM OR DISCHARGING LIQUIDS INTO VACUUM.
(Application filed Feb. 1, 1901.)
(No Model.) 7 Sheets—Sheet 5.

WITNESSES:

INVENTORS
Eugene L. McGary
& Daniel McGary
BY Kay & Totten
ATTORNEYS

No. 673,659. Patented May 7, 1901.
E. L. & D. McGARY.
APPARATUS FOR REMOVING LIQUIDS FROM OR DISCHARGING LIQUIDS INTO VACUUM.
(Application filed Feb. 1, 1901.)
(No Model.) 7 Sheets—Sheet 6.
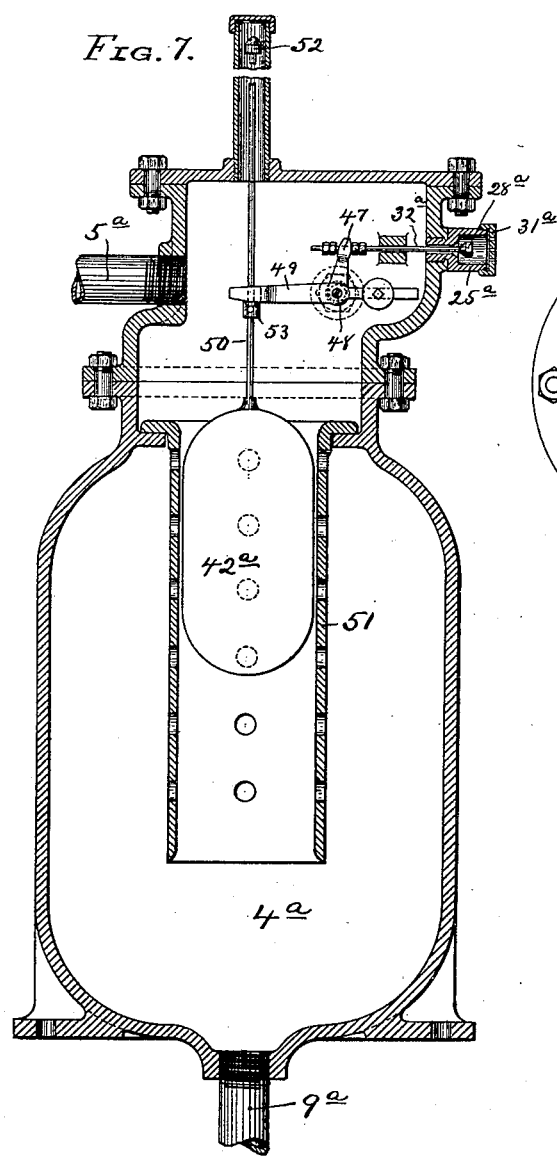
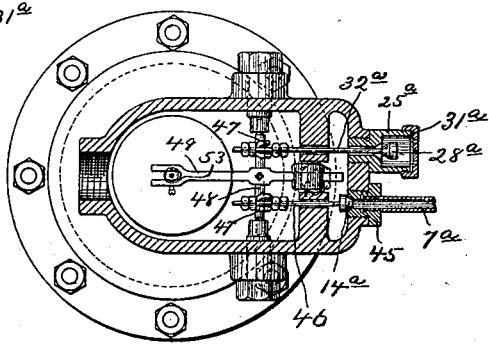

No. 673,659. Patented May 7, 1901.
E. L. & D. McGARY.
APPARATUS FOR REMOVING LIQUIDS FROM OR DISCHARGING LIQUIDS INTO VACUUM.
(Application filed Feb. 1, 1901.)

(No Model.) 7 Sheets—Sheet 7.

WITNESSES: INVENTORS

UNITED STATES PATENT OFFICE.

EUGENE L. McGARY AND DANIEL McGARY, OF PITTSBURG, PENNSYLVANIA.

APPARATUS FOR REMOVING LIQUIDS FROM OR DISCHARGING LIQUIDS INTO VACUUM.

SPECIFICATION forming part of Letters Patent No. 673,659, dated May 7, 1901.

Application filed February 1, 1901. Serial No. 45,596. (No model.)

*To all whom it may concern:*

Be it known that we, EUGENE L. MCGARY and DANIEL MCGARY, residents of Pittsburg, in the county of Allegheny and State of Pennsylvania, have invented a new and useful Improvement in Apparatus for Removing Liquids from or Discharging Liquids into Vacuum; and we do hereby declare the following to be a full, clear, and exact description thereof.

Our invention relates to apparatus for removing water or other liquids from or discharging water or other liquids into vessels or other receptacles wherein atmospheric or other gaseous pressure is absent or less than the normal atmospheric pressure.

The invention is of especial utility in removing water of condensation from the exhaust pipes or chambers of condensing steam-engines.

In the use of condensing-engines the exhaust-steam is discharged from the engine-cylinder into a pipe or other vessel wherein a vacuum is maintained or endeavored to be maintained by means of the condensing apparatus. It has been found that water is sometimes formed in the exhaust pipes or chambers by condensation and unless removed is liable to choke the exhaust-outlet or to flow into the engine-cylinder, resulting in serious damage to the engine. One object of our invention is to remove this water without interfering with the working of the condensing apparatus, and to effect this we provide, generally stated, a receiver vessel connected to the exhaust-pipe which it is desired to drain by a suitable drain-pipe provided with a suitable check-valve so located that if atmospheric pressure is allowed to enter the drain-pipe from the receiver vessel the check-valve will close, or if a vacuum or partial vacuum is maintained in the receiver vessel and an equal vacuum is maintained in the exhaust-pipe the water from the exhaust-pipe will open the check-valve and flow into the receiver vessel. To the receiver vessel we connect a discharge-pipe leading to any convenient point where it may be desired to drain the accumulated water. On this discharge-pipe we provide a check-valve similar to the one on the drain-pipe above mentioned, with the check-valve so arranged that while a vacuum or partial vacuum is maintained in the receiver vessel the atmospheric pressure acting through the discharge-pipe will keep the check-valve closed. Thus it will be seen that as long as a vacuum or partial vacuum is maintained in the receiver vessel the check-valve on the drain-pipe will remain open, allowing the water of condensation to flow into and collect in the receiver vessel. By admitting the atmosphere to the receiver vessel the check-valve on the drain-pipe will close, preventing the atmosphere from entering the exhaust-pipe, and the water in the receiver vessel will open the check-valve on the discharge-pipe and flow from the receiver vessel. By closing the aperture through which air was admitted to the receiver vessel and removing the air which had entered the vessel upon the discharge of the water we again produce a vacuum in the receiver vessel, thus causing the check-valve on the discharge-pipe to close and the check-valve on the drain-pipe to open, again permitting water to flow from the exhaust-pipe to the receiver vessel.

The accompanying drawings show apparatus designed to carry out our invention.

Like numerals of reference indicate like parts in each view.

Figure 2:
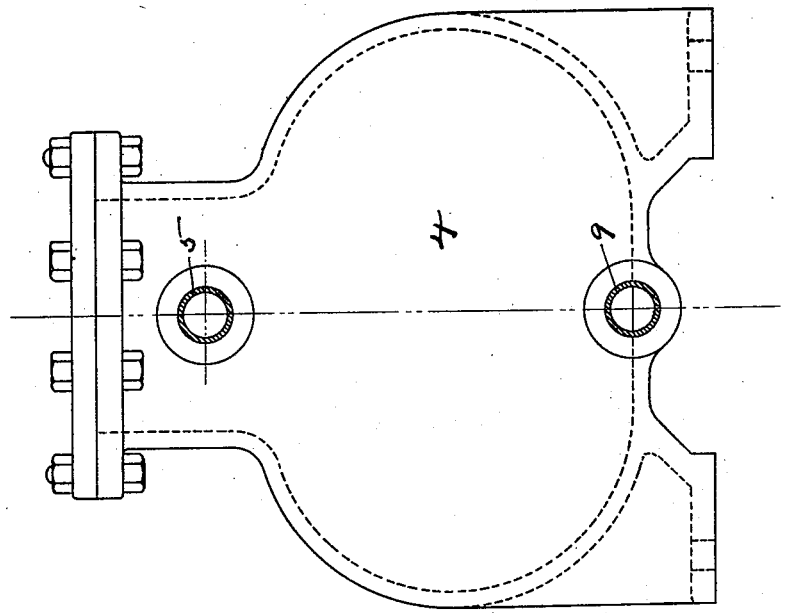
Figure 3:
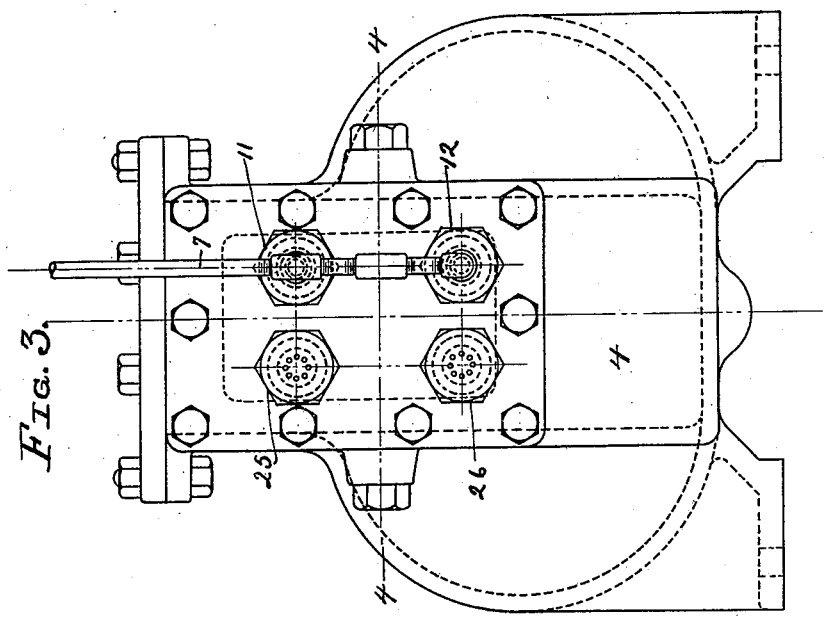
Figure 4:
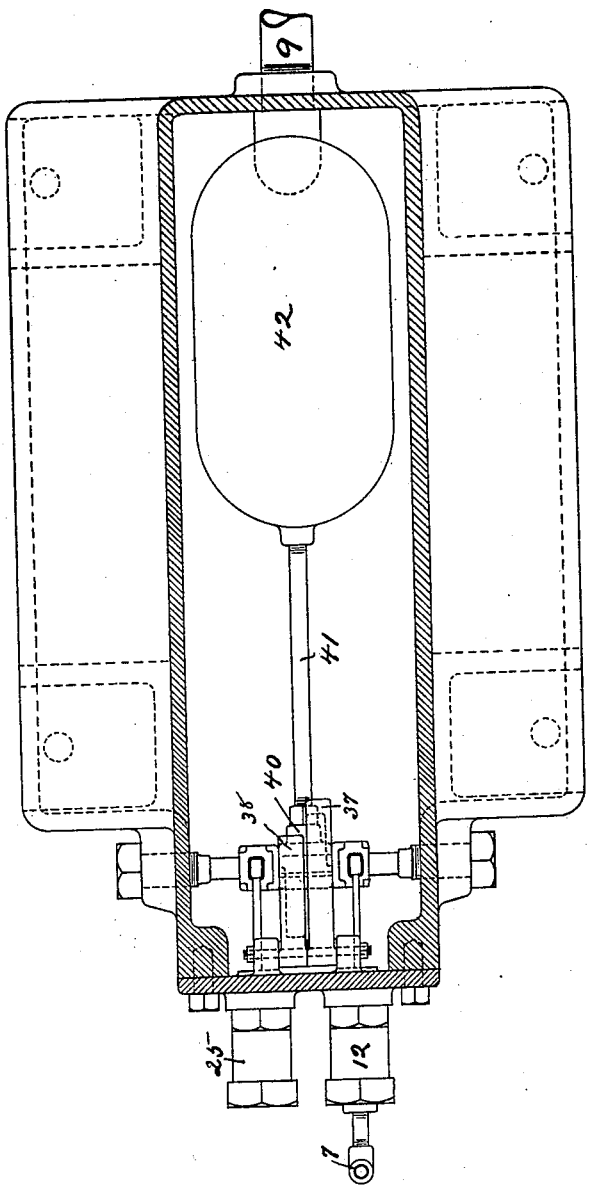
Figure 5:
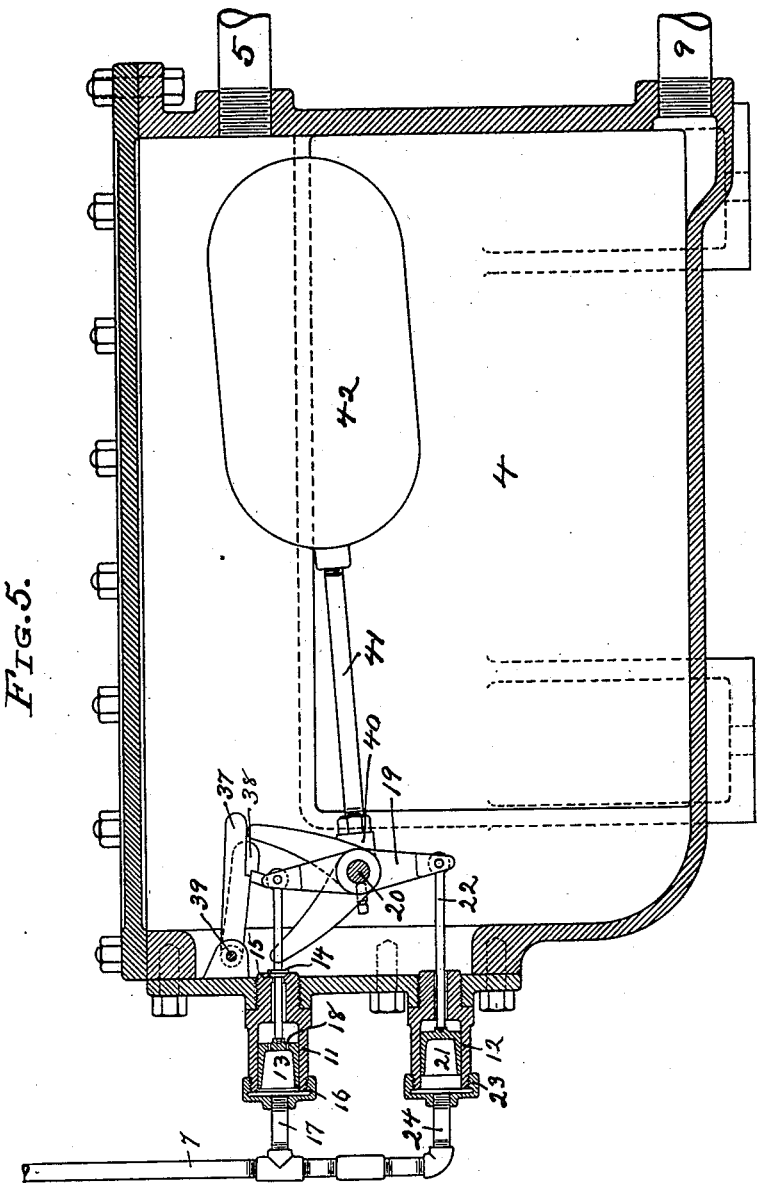
Figure 6:
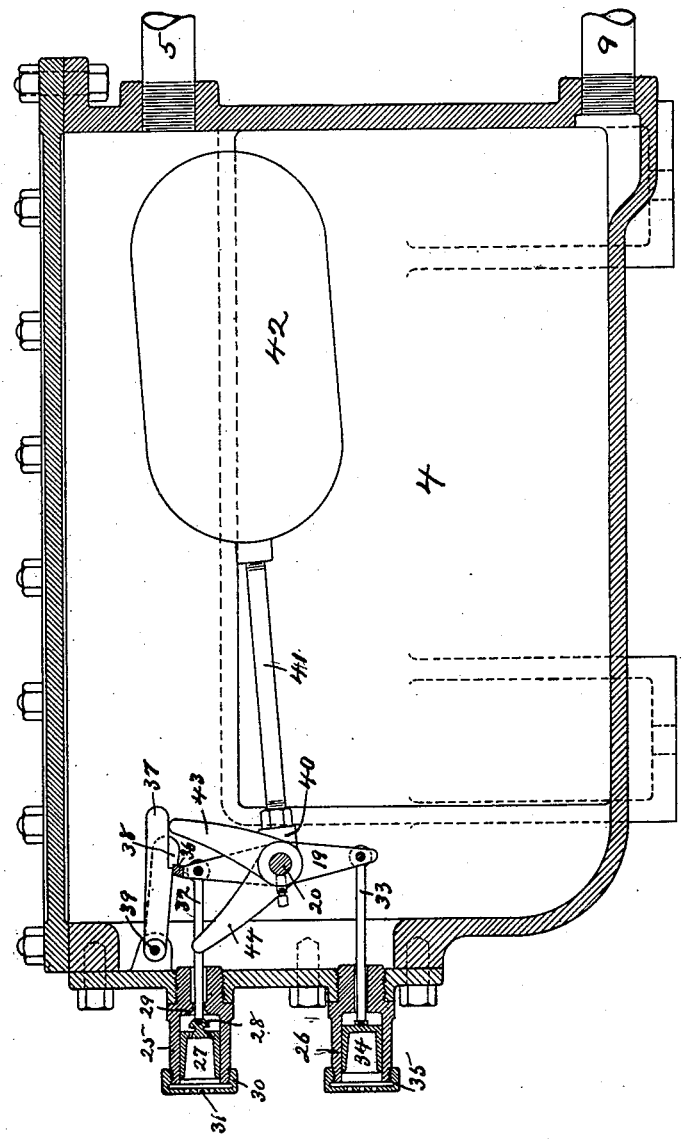
Figure 9:
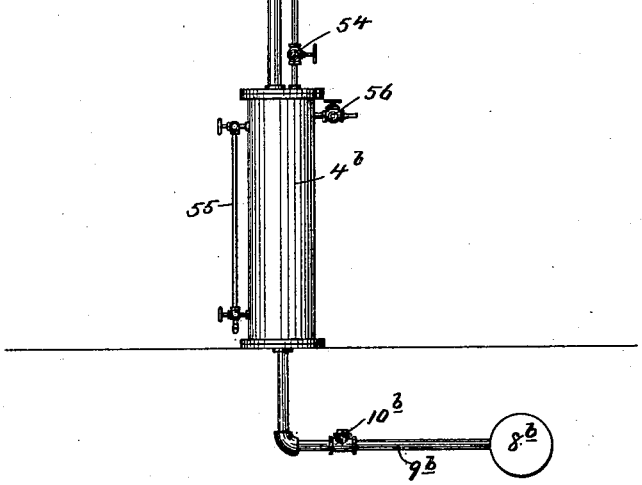

Figure 1 is a view showing an ordinary condensing-engine with the arrangement of receiver vessel in relation to the exhaust-pipes which it is desired to drain. Fig. 2 is a rear end view of the receiver vessel, showing the relative location of the drain-pipe to the receiver vessel and discharge-pipe for same. Fig. 3 is a front end elevation showing the relative arrangement of the vacuum-valve and free-air valve. Fig. 4 is a sectional plan view through line 4 4 of Fig. 3. Fig. 5 represents a sectional elevation showing the arrangement of vacuum-valve. Fig. 6 is a sectional elevation showing the arrangement of free-air valve. Fig. 7 is a sectional view of another form of our apparatus. Fig. 8 is a section of the same on the line 8 8, and Fig. 9 is a view of a form of apparatus designed to be operated by hand.

Referring to Fig. 1, 1 represents a suitable condensing steam-engine, to which our invention may be applied, with the exhaust-pipe 2 leading from the engine-cylinder to the exhaust-main 3, which is connected to a suitable condenser. (Not shown.) A receiver vessel 4 is connected to the exhaust-main 2 3 by means of a drain-pipe 5, which is provided with a suitable valve 6, preferably a check-valve. The receiver vessel 4 is also connected to the exhaust-main 3 by means of a small vacuum-pipe 7. Leading from the receiver vessel 4 to the sewer 8 is the discharge-pipe 9, which is provided with a suitable valve 10, preferably a check-valve.

Referring to Fig. 5, it will be noted that we provide in the end of the receiver vessel 4 valve-chambers 11 and 12. In the valve-chamber 11 is a guide-piston 13, attached to the valve-stem carrying the vacuum-valve 14, which works on the valve-seat 15, formed on the end of the chamber 11. On the outer end of valve-chamber 11 is the cap 16, through which connection is made to the vacuum-pipe 7 by the connection 17. The guide-piston 13 is provided with perforations 18 in its end to admit the passage of air to either end of this guide-piston, so that when valve 14 is open air is free to pass from the receiver vessel 4 to the vacuum-pipe 7. The stem of this vacuum-valve 14 is connected to one arm of the double vertical lever 19, mounted on the shaft 20, supported within the receiver 4. Beneath this vacuum-valve we provide the valve-chamber 12, in which works the small piston 21, which is connected by rod 22 to the lower arm of the lever 19. The outer end of valve-chamber 12 is provided with cap 23, through which connection is made with the vacuum-pipe 7 by the connection 24.

Referring to Figs. 3, 4, and 6, it will be noted that alongside of the vacuum-valve we provide a free-air valve chamber 25, and below this we provide the free-air piston chamber 26. In chamber 25 works the guide-piston 27, which is provided at its inner end with a free-air valve 28, working on the valve-seat 29, formed in chamber 25. On the outer end of chamber 25 is provided a cap 30, which contains perforations 31 to admit the atmosphere to the inside of chamber 25. Guide-piston 27 is also provided with similar perforations, so that when the free-air valve 28 is moved outward away from its seat the atmosphere is free to pass into the receiver vessel 4. This free-air valve 28 and its guide-piston 27 are connected to the vertical lever 19 by the rod 32. To the lower arm of lever 19 is connected by the rod 33 the piston 34. This piston 34 works in the chamber 26, which is attached to the end of the receiver vessel 4. On the outer end of chamber 26 is provided a perforated cap 35. The lever 19 is made double in order to provide attachments for both the vacuum-valve 14 and its piston 13 and also free-air valve 28 and its piston 27. Across the top and forming part of the lever 19 is the cross-rib 36. Mounted over this cross-rib 36 are the two latches 37 and 38, mounted loosely on pin 39. The arrangement of the valves and latches is such that when the vacuum-valve 14 is closed the free-air valve 28 is open, and the latch 38, engaging with cross-rib 36 prevents the opening of valve 14 and the closing of valve 28. On the contrary, when the valve 14 is open and the valve 28 is closed the latch 37 engaging in cross-rib 36 prevents valve 28 from opening and valve 14 from closing. Mounted also on shaft 20 is the socket 40, to which is connected the arm 41, carrying on its outer end the float 42. Attached to the socket 40 are the arm 43, located under latch 37, and arm 44, located under latch 38. The arrangement of these arms 43 and 44 is such that by raising the float 42 to the position shown in Figs. 5 and 6 the arm 43 is brought up under latch 37, disengaging same from cross-rib 36. In like manner if the float 42 drops to a certain position the arm 44 moves forward, raising latch 37 and disengaging same from cross-rib 38.

The operation of the apparatus so far described is as follows: Assuming that pipe 7 is connected to the exhaust-main 3, in which is maintained a vacuum or partial vacuum, valve 14 will be open, and a consequent vacuum is maintained in the receiver vessel 4, so that, as previously explained, water of condensation will flow through the pipe 5 into and collect in the receiver vessel 4, gradually lifting the buoyant float 42. In consequence of the vacuum or partial vacuum in the receiver vessel 4 the atmosphere entering through perforated cap 35 and acting on the outside of piston 34 is tending to move stem 33 inwardly and by means of lever 19 is tending to force backward the valve 28 to open same; but this opening of valve 28 is prevented by latch 37, which is engaged in the cross-rib 36. As the water-level in the receiver vessel rises the buoyant float 42 is also lifted until such a height is reached that the arm 43 raises and disengages latch 37 from rib 36, allowing piston 34 to be moved forward by the atmospheric pressure exerted on its outside. By moving the piston 34 forward the free-air valve 28 is opened and the vacuum-valve 14 is closed and the latch 37 drops into position, engaging the cross-rib 36, thus preventing the vacuum-valve 14 from opening and the free-air valve 28 from closing. The atmosphere is then free to enter the receiver vessel 4 through the free-air valve in chamber 25. When the atmosphere enters receiver vessel 4 and destroys the vacuum previously contained therein, the check-valve 6 on the drain-pipe 5 closes and the check-valve 10 on the discharge-pipe 9 opens, permitting water collected in the receiver vessel 4 to flow from same. As this water discharges from the receiver vessel 4 the buoyant float 42 drops correspondingly until arm 44 raises the latch 38. Meanwhile at the outer end of the piston 21 a vacuum is maintained by means of vacuum-pipe 7, while the atmospheric pressure is exerted on the inside of piston 21, due to the atmosphere which has entered the receiver vessel 4 through the opening of valve 18. As soon, therefore, as arm 44 disengages latch 37 the atmosphere will tend to force piston 21 outward, thus closing the valve 28, opening valve 14, and allowing the latch 37 to drop into position, holding the valves in the position just given. Then, the valve 14 being open, a vacuum is again created in the receiver vessel 4 through the pipe 7, allowing the check-valve 10 to close, when the receiver vessel 4 is again ready to accumulate the water of condensation.

Referring to Figs. 7 and 8, $4^a$ represents the receiver vessel, which is connected by the pipe $9^a$ to the sewer and by the pipe $5^a$ to the exhaust pipe or main which it is intended to drain in the same manner that the receiver vessel in the previous modification is connected to the sewer and exhaust-main, respectively. One side of the upper part of the receiver vessel is provided with an attachment for the vacuum-pipe $7^a$ and with a chamber $25^a$, in which works the free-air valve $28^a$, the said chamber being closed at its outer end by a perforated cap $31^a$. The vacuum-pipe $7^a$ is connected to the said chamber by means of a bushing 45, which is provided on its inner side with a seat for the vacuum-valve $14^a$. This valve is provided with a stem 46, which is engaged at its inner end by the forked end of an arm 47, secured to the rock-shaft 48, suitably mounted in the receiver-chamber. The free-air valve $28^a$ has the inner end of its valve-stem $32^a$ engaged by the forked end of a similar arm 47, secured to the rock-shaft 48. Also secured to the rock-shaft 48 is a counterbalanced lever 49, having its inner end forked and engaging the stem 50 of the float $42^a$, which works in the vertical guide-tube 51 in the receiver vessel $4^a$. The upper end of the stem 50 is provided with a suitable stop 52, and secured to said stem is the adjustable stop 53. The free-air valve $28^a$ and vacuum-valve $14^a$ seat in opposite directions and are arranged so that when one of said valves is closed the other is open. The operation of this form of apparatus is as follows: Normally the float $42^a$ is in its lowermost position and the free-air valve $28^a$ is closed, while the vacuum-valve $14^a$ is open. In this position a vacuum or partial vacuum is maintained in the receiver vessel, and the water of condensation enters through the pipe $5^a$ and gathers in said vessel until it has reached such a height that the float $42^a$ has moved the stop 53 to raise the inner end of the lever 49, which movement causes the shaft 48 to rock and closes the vacuum-valve $14^a$ and opens the free-air valve $28^a$. This permits atmospheric pressure to enter the receiver vessel $4^a$, causing the water therein to flow out through the pipe $9^a$. As soon as the water has fallen sufficiently the stop 52 on the float-stem 50 rocks the lever 49 downwardly, thereby closing the free-air valve and opening the vacuum-valve, which again permits a vacuum to be formed in the receiver vessel $4^a$.

As the apparatus may be constructed to operate by hand, we have illustrated such a form in Fig. 9.

Referring to Fig. 9, $3^b$ is the exhaust-main which it is desired to drain with the drain-pipe $5^b$, leading from same to the receiver vessel $4^b$. On the drain-pipe $5^b$ is located the check-valve $6^b$. Connecting the exhaust-pipe $3^b$ and the receiver vessel $4^b$ is the small vacuum-pipe $7^b$, provided with the stop-valve 54. Leading from the receiver vessel $4^b$ to sewer $8^b$ is the discharge-pipe $9^b$, which is provided with a check-valve $10^b$. On the side of the receiver vessel $4^b$ is provided the water glass gage 55, and near or at the top of such receiver vessel $4^b$ is the small air-cock 56. In practice the operation of this device is as follows: Closing the air-cock 56 and opening the valve 54, we create a vacuum in the receiver vessel $4^b$, and in consequence of which the water of condensation formed in the exhaust-pipe $3^b$ will drain to and collect in the receiver vessel $4^b$. As this water collects in the receiver vessel $4^b$ the height of the water is shown in the gage-glass 55. When the attendant sees that the receiver vessel $4^b$ is filled, or nearly so, he closes the valve 54 and opens the air-cock 56, allowing the atmosphere to enter the receiver vessel $4^b$, thus closing the check-valve $6^b$. The weight of the water in the receiver vessel $4^b$ will then open the check-valve $10^b$, allowing the accumulated water to drain into the sewer $8^b$. When the receiver vessel is empty, the attendant closes air-cock 56 and, opening valve 54, again produces a vacuum in the receiver vessel, permitting the water of condensation to again flow into same.

The apparatus so far described is for the purpose of removing water of condensation from steam and other vessels in which atmospheric or other gaseous pressure does not exist or is less than the normal atmospheric pressure, and as the apparatus which removes the atmospheric or other gaseous pressure from said vessels forms no part of our invention we have not deemed it necessary to describe or illustrate the same. It will be readily understood by those skilled in the art that in the use of a condensing steam-engine the air is removed from the exhaust-pipes and a vacuum or partial vacuum is maintained therein by means of ordinary condensing apparatus.

It will also be apparent that the herein-described apparatus can be used not only for discharging water from the vacuum or partial vacuum against atmospheric pressure, but can also be used by a suitable arrangement of the check-valves on the discharge and drain pipes to discharge water or other liquids into a receptacle wherein a vacuum or partial vacuum exists. The vacuum-receptacle will take the place of the sewer 8 in the above-described apparatus, and the check-valves on the drain and discharge pipes will be arranged to open in the reverse direction from that illustrated.

It is apparent that the receiver-vessel 4 may be constructed in many different forms and that the opening and closing of the free-air and vacuum valves can be controlled by various means. We therefore do not limit ourselves to the exact construction of the various parts, as these may be generally modified without departing from the spirit of the invention, since

What we claim, and desire to secure by Letters Patent, is—

1. In apparatus for the removal of water or other liquids from steam-pipes or other receptacles wherein atmospheric or other gaseous pressure is absent or less than the normal atmospheric pressure, the combination, with a receptacle to be drained, of a receiver, valve-controlled connections between said receiver and said receptacle through which the liquid may pass, a valve-controlled connection through which the liquid may be discharged from said receiver, and a valve-controlled connection between said receptacle and said receiver through which the atmospheric pressure can be removed from the interior of said receiver.

2. In apparatus for the removal of water or other liquids from steam-pipes or other receptacles wherein atmospheric or other gaseous pressure is absent or less than the normal atmospheric pressure, the combination with a receptacle to be drained, of a receiver, valve-controlled connections between said receiver and said receptacle through which the liquid may pass, a valve-controlled connection through which the liquid may be discharged from said receiver, a valve controlling communication between said receiver and a vacuum-creating device, and means for introducing air into said receiver.

3. In apparatus for the removal of water or other liquids from steam-pipes or other receptacles wherein atmospheric or other gaseous pressure is absent or less than the normal atmospheric pressure, the combination with a receptacle to be drained, of a receiver, valve-controlled connections between said receiver and said receptacle, a valve-controlled connection through which the liquid may be discharged from said receiver, a valve controlling connections between said receptacle and said receiver, a valve for admitting air to said receiver, and means for automatically operating said valves.

4. In apparatus for the removal of water or other liquids from steam-pipes or other receptacles wherein atmospheric or other gaseous pressure is absent or less than the normal atmospheric pressure, the combination with a receptacle to be drained, of a receiver, valve-controlled connections between said receiver and said receptacle, a valve-controlled connection through which the liquid may be discharged from said receiver, a vacuum-valve controlling connections between said receptacle and said receiver, an air-valve for admitting air to said receiver, and means for automatically opening and closing said vacuum and air valves alternately.

5. In apparatus for the removal of water or other liquids from steam-pipes or other receptacles wherein atmospheric or other gaseous pressure is absent or less than the normal atmospheric pressure, the combination with a receptacle to be drained, of a receiver, valve-controlled connections between said receiver and said receptacle, a valve-controlled connection through which the liquid may be discharged from said receiver, a vacuum-valve controlling connections between said receptacle and said receiver, an air-valve for admitting air to said receiver, connnections between said vacuum-valve and air-valve, and means for automatically opening and closing said valves alternately.

6. In apparatus for the removal of water or other liquids from steam-pipes or other receptacles wherein atmospheric or other gaseous pressure is absent or less than the normal atmospheric pressure, the combination with a receptacle to be drained, of a receiver, valve-controlled connections between said receiver and said receptacle, a valve-controlled connection through which the liquid may be discharged from said receiver, a vacuum-valve controlling connections between said receptacle and said receiver, an air-valve for admitting air to said receiver, connections between said vacuum-valve and air-valve, a float in said receiver, means for holding said valves in their open and closed positions, and valve-releasing mechanism operated by said float.

7. In apparatus for the removal of water or other liquids from steam-pipes or other receptacles wherein atmospheric or other gaseous pressure is absent or less than the normal atmospheric pressure, the combination with a receptacle to be drained, of a receiver, valve-controlled connections between said receiver and said receptacle, a valve-controlled connection through which the liquid may be discharged from said receiver, a vacuum-valve controlling connections between said receptacle and said receiver, an air-valve for admitting air to said receiver, a rocker-arm, connections between said vacuum and air valves and one end of said rocker-arm, a vacuum-operated piston and an air-operated piston connected to the other end of said rocker-arm, means for locking said rocker-arm, and float-operated mechanism for releasing said locking mechanism.

8. In apparatus for the removal of water or other liquids from steam-pipes or other receptacles wherein atmospheric or other gaseous pressure is absent or less than the normal atmospheric pressure, the combination with a receptacle to be drained, of a receiver, valve-controlled connections between said receiver and said receptacle, valve-controlled connections through which the liquid may be discharged from said receiver, a vacuum-valve controlling connections between said receptacle and said receiver, an air-valve for admitting air to said receiver, a rocker-arm, connections between said vacuum and air valves and one end of said rocker-arm, a vacuum-operated piston and an air-operated piston connected to the other end of said rocker-arm, means for locking said rocker-arm, a float, and tripping mechanism operated by said float and adapted to release said locking mechanism.

9. In apparatus for the removal of water or other liquids from steam-pipes or other receptacles wherein atmospheric or other gaseous pressure is absent or less than the normal atmospheric pressure, the combination with a receptacle to be drained, of a receiver, valve-controlled connections between said receiver and said receptacle, a valve-controlled connection through which the liquid may be discharged from said receiver, a vacuum controlling connections between said receptacle and said receiver, an air-valve for admitting air to said receiver, a rocker-arm, connections between said vacuum and air valves and one end of said rocker-arm, a vacuum-operated piston and an air-operated piston connected to the other end of said rocker-arm, latches adapted to engage said rocker-arm, a float and trip-arms operated by said float and adapted to release said latches.

10. In apparatus for the removal of water or other liquids from steam-pipes or other receptacles wherein atmospheric or other gaseous pressure is absent or less than the normal atmospheric pressure, the combination with a receptacle to be drained, of a receiver, valve-controlled connections between said receiver and said receptacle, a valve-controlled connection through which the liquid may be discharged from said receiver, a piston-operated vacuum-valve controlling a passage into said receiver, a piston-operated air-valve controlling a passage into said receiver, a rocker-arm, connections between said last-named valves and said rocker-arm, a vacuum-operated piston and an air-operated piston connected to the opposite end of said rocker-arm, means for locking said rocker-arm, a float, and mechanism for releasing said rocker-arm, operated by said float.

11. In apparatus for discharging water or other liquids from one vessel, or reservoir, into another vessel wherein atmospheric or other gaseous pressure is absent or less than the normal atmospheric pressure, the combination with a vacuum vessel and a receptacle to be drained, of a receiver, valve-controlled connections between said receiver and said receptacle through which the water or other liquid may pass, valve-controlled connections between said receiver and said vacuum vessel through which the liquid may be discharged from said receiver to said vacuum vessel, and a valve-controlled connection between said receiver and said vacuum vessel through which atmospheric pressure can be removed from the interior of said receiver.

In testimony whereof we, the said EUGENE L. MCGARY and DANIEL MCGARY, have hereunto set our hands.

EUGENE L. MCGARY.
DANIEL MCGARY.

Witnesses:
ROBT. D. TOTTEN,
ROBERT C. TOTTEN.